United States Patent

Chupeau et al.

Patent Number: 6,031,538
Date of Patent: Feb. 29, 2000

[54] METHOD FOR THE GENERATION OF SYNTHETIC IMAGES

[75] Inventors: Bertrand Chupeau; Laurent Blonde; Jean-Christophe Dusseux; Philippe Bordes, all of Courbevoie Cedex, France

[73] Assignee: Thomson Broadband Systems, Brest, France

[21] Appl. No.: 08/619,526

[22] PCT Filed: Jul. 28, 1995

[86] PCT No.: PCT/FR95/01019

§ 371 Date: Jul. 9, 1996

§ 102(e) Date: Jul. 9, 1996

[87] PCT Pub. No.: WO96/07162

PCT Pub. Date: Mar. 7, 1996

[30] Foreign Application Priority Data

Aug. 30, 1994 [FR] France ................................. 94 10413

[51] Int. Cl.[7] .................................................. G06T 17/00
[52] U.S. Cl. ........................................................ 345/419
[58] Field of Search .................................. 395/173–175, 395/119, 949–960

[56] References Cited

U.S. PATENT DOCUMENTS

| | | | |
|---|---|---|---|
| 5,317,685 | 5/1994 | Morimura et al. | 345/474 |
| 5,325,472 | 6/1994 | Horiuchi et al. | 345/427 |
| 5,432,895 | 7/1995 | Myers | 345/419 |
| 5,455,689 | 10/1995 | Taylor et al. | 358/450 |
| 5,506,949 | 4/1996 | Perrin et al. | 345/473 |
| 5,513,303 | 4/1996 | Robertson et al. | 345/419 |
| 5,513,306 | 4/1996 | Mills et al. | 707/530 |
| 5,577,175 | 11/1996 | Naka et al. | 345/427 |
| 5,579,455 | 11/1996 | Greene et al. | 345/422 |
| 5,734,743 | 3/1998 | Matsugu et al. | 382/154 |
| B1 4,600,919 | 9/1992 | Stern | 345/473 |

FOREIGN PATENT DOCUMENTS

| | | |
|---|---|---|
| 4600919 | 7/1986 | European Pat. Off. . |
| 0461577 | 12/1991 | European Pat. Off. . |
| 046157A2 | 12/1991 | European Pat. Off. . |

*Primary Examiner*—Anton Fetting
*Attorney, Agent, or Firm*—Oblon, Spivak, McClelland, Maier & Neustadt, P.C.

[57] ABSTRACT

The generation of images is done by the computation of the motion vectors representing the evolution from one image 2D to the other, directly from the co-ordinates and coefficients of geometrical transformation, of associated points in the 3D scene. The applications relate to the generation of monocular sequences by temporal interpolation and of stereoscopic sequences by extrapolation.

16 Claims, 7 Drawing Sheets

METHOD FOR THE GENERATION OF SYNTHETIC IMAGES

BACKGROUND OF THE INVENTION

1. Field of the Invention

The present invention relates to a method for the generation of synthetic images, especially for the generation of image sequences.

The field of the invention is that of image synthesis by computer, namely the synthesis of monocular images for display on conventional screens and binocular or stereoscopic images for display in relief in virtual image type applications.

The aim of such methods is to reduce the cost of computation of the image sequences generated.

2. Discussion of the Background

In the known approaches, the volume of computations required is reduced by a limiting, done homogeneously in the temporal and spatial domains, of the information elements processed by a rendition algorithm that enables the preparing of a 2D image on the basis of structural data modelling the 3D scene to be displayed. The diminishing of computation costs then occurs inevitably to the detriment of the realism of the sequence thus generated.

The next step in the reduction of computation costs, which is also a known one, is a temporal interpolation that recreates intermediate images from key images, which are the only images computed on the basis of the rendition algorithm. The generation of such images is generally based on the use of velocity vectors computed from one image to the next one by means of these images and is therefore based on an estimate of the displacement of the pixels of the image.

In all these cases of interpolation, whether they are simple repetitions of images or entail methods of greater complexity such as space/time filtering operations, there are jerking and echo effects. These effects arise out of the fact that neither the individual motion of objects in the scene nor the motion of the observation point is taken into account. The temporal interpolation generates "estimated" images which are therefore not always of good quality.

SUMMARY OF THE INVENTION

The present invention is aimed at reducing such deterioration of synthetic images.

To this end, and according to the invention, there is proposed a method for the generation of synthetic images from structural data modelling a 3D scene to be displayed and data representing an apparent relative evolution of the scene with respect to a viewpoint, the structural data enabling the computation of the co-ordinates of points of the 3D scene and the data on the evolution of the scene enabling the computation of the coefficients of geometrical transformation associated with these points, at which there is generated, on the basis of the structural data and a rendition algorithm, a 2D image representing the scene seen from this viewpoint, characterised in that, with each point of the 2D image there is associated a corresponding point of the 3D image and a motion vector representing the displacement of this point of the image due to the apparent evolution of the corresponding point of the 3D scene with respect to the viewpoint, said motion vectors of the pixels of the image generated having been computed on the basis of the co-ordinates and coefficients of the associated points of the 3D scene in order to use them in the generation of at least one other 2D image on the basis of the first image, and then the generated images are shown on a display screen.

An object of the invention is also the use of fields of reverse apparent velocity vectors for the temporal interpolation and of fields of disparity vectors for an extrapolation of an image generating a stereoscopic pair of images. An object of the invention is also the generation of a stereoscopic sequence on the basis of the extrapolation and interpolation vectors.

The invention therefore relates to the generation of monocular sequences as well as stereoscopic sequences.

The advantages obtained through this invention are a reduction of the cost of computing an image or a sequence of monocular or stereoscopic images, improved image quality and therefore high realism of the scene by means of a more reliable and simpler computation of the temporal interpolation or spatial extrapolation vectors for a stereoscopic image, management of appearing and vanishing zones to achieve the interpolation on the basis of the final or initial image, management of conflicts of projection of the interpolation vectors as a function of the distance from the corresponding points of the 3D scene to the observation point, and a generation of one of the two stereoscopic channels on the basis of the extrapolation vectors of one channel.

To summarise: in the prior art, first of all at least two successive key 2D images were generated by means of a rendition algorithm, and then intermediate images were computed by an interpolation between two of these key images. This entailed major difficulties in making the characteristic points of the two images correspond with each other. By contrast, the invention proposes the generation of additional images from a key image obtained by the rendition algorithm and from motion vectors computed directly on the basis of data defining the evolution (rotation, translation motion, changes in focal length) of the 3D scene.

BRIEF DESCRIPTION OF THE DRAWINGS

Other features and advantages of the invention shall appear more clearly from the following description, given by way of a non-restrictive example and made with reference to the appended figures, of which.

DISCUSSION OF THE PREFERRED EMBODIMENTS

Figure 1:
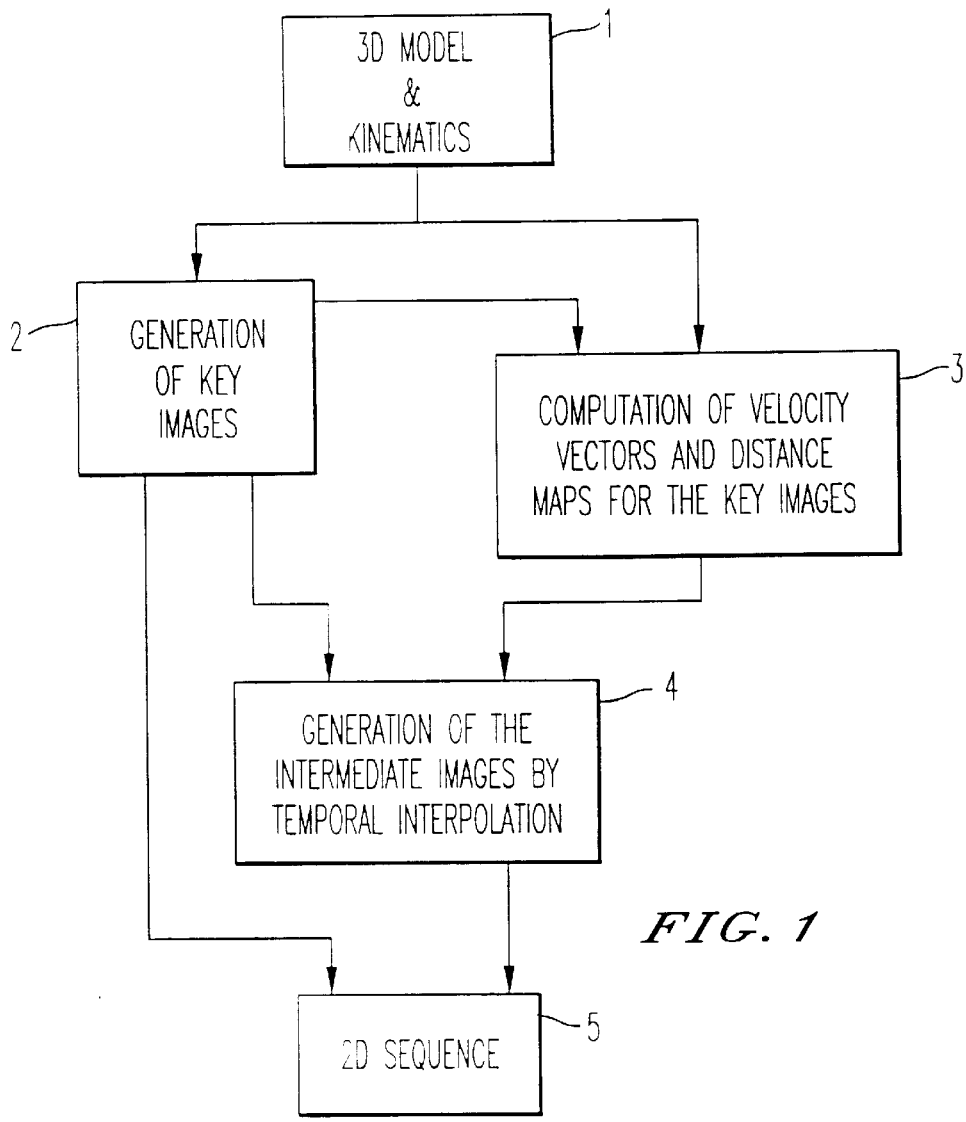
FIG. 1 represents the algorithm for the generation of a sequence of monocular images.

The diagram of FIG. 1 shows an algorithm for the acceleration of image synthesis in the case of sequences of monocular animated images.

The exploited data, pertaining to the 3D scene that is the object of the sequence of animated images available at the input 1 of the algorithm, are information elements on the structure of the 3D scene of which a model is made and on its kinematic values.

In a step 2, these information elements are processed by a rendition algorithm to generate a limited number of images in the sequence known as key images. A step 3 achieves the computation of a map of the velocity and distance vectors on the basis of the animation parameters, which are the data on the kinematic values of the scene, and of the key images generated during the step 2. It thus assigns, to each pixel (i, j) of the key image K(t), an apparent velocity vector $V^+(i, j, t)$ corresponding to the displacement of this pixel from the previous key image K(t−N) to this key image K(t) and an apparent velocity vector $V^-(i, j, t)$ corresponding to the displacement of this pixel from the image K(t) to the image K(t+N) or more precisely the reverse of this motion vector. These velocity vectors may be likened to motion vectors representing the displacement of the pixels from one image to the next one during the time interval between two consecutive key images.

Figure 2:
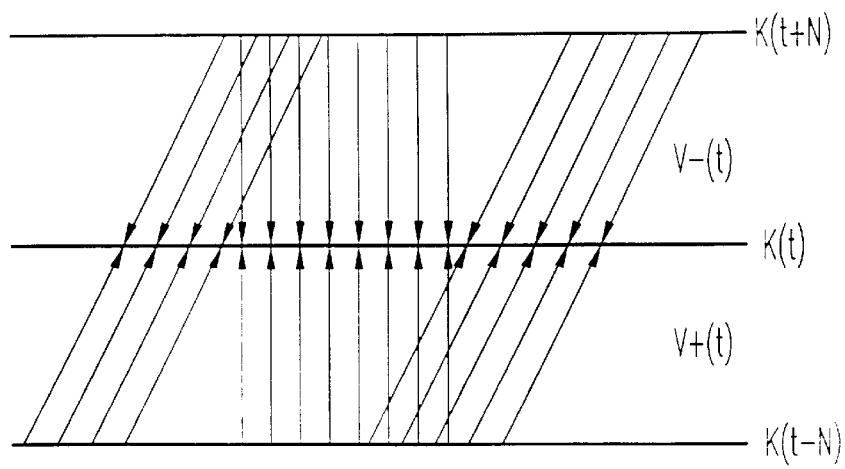
FIG. 2 shows the map of the apparent velocity vectors of a key image $K_{(t)}$.

FIG. 2 illustrates the definition of the two fields of the apparent velocity vectors $V^+$ and $V^-$ representing the vector map of the key image K(t). These vectors correspond to the apparent displacement between two key images if the time unit is the interval between two key images. The field of vectors $V^-(t)$ represents the displacement of all the pixels of the key image K(t) from the next key image K(t+N) up to the key image K(t) and the field of vectors $V^+(t)$ represents the displacement of all the pixels of the key image K(t) from the previous key image K(t−N) up to the key image K(t).

For each pixel, this step also computes the distance from its corresponding point in the 3D scene to the point at which the scene is seen, namely the fictitious camera that is supposed to film the scene. This value represents the minimum distance in the direction defined by the pixel between the scene and the camera since, in the case of hidden elements, it is the element closest to the camera that is taken into account. This value may also come from the image generation step 2 when the technique for the generation of key images is based on methods of the depth buffer type which manage the projection of 3D information in the image plane by the storage, for each pixel, of a value representing this minimum distance. In this case, the distance map directly comes from the step 2.

Computation of the Apparent Speed

Before going to the next step 4, an explanation is given here below of the method of computation of the apparent speed of each pixel of a key image.

The apparent speed, namely the speed of displacement of the pixel of the image in the image plane with reference to the point from which the 3D scene is seen, is computed on the basis of the model of the 3D scene.

In theory, the apparent motion (2D motion) is the projection of the real motion (3D motion) on the focal plane of the camera (image plane). The projection model most commonly used in image synthesis is the plane projection model (perspective projection of the pinhole type).

Should another projection model be used, the formulation of the computation of the motion must be adapted accordingly.

Figure 3:
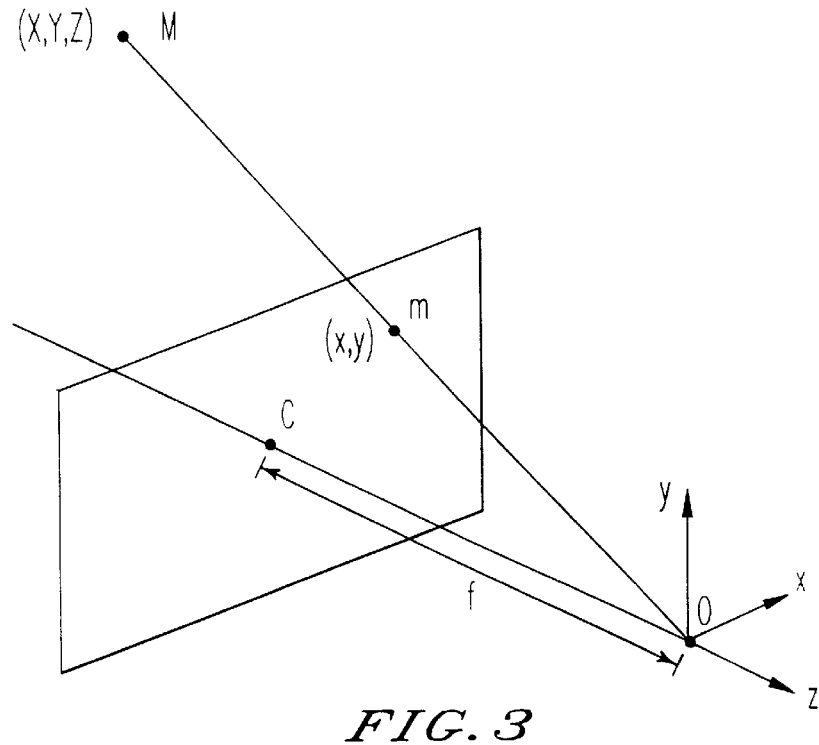
FIG. 3 shows a projection of a point of the 3D scene on the focal plane.

In order to define the pinhole model, the following points and parameters are shown in FIG. 3:

| | |
|---|---|
| P | the projection plane on which the 3D image is projected |
| (O, x, y, z) | the projection reference at the instant t, (centre O and axes Ox, Oy, Oz) |
| f | the "focal distance" corresponding to the projection plane, namely the distance between the centre of projection O and the projection plane P |
| M (X, Y, Z) | the point of the 3D space, having coordinates X, Y, Z in the reference system (o, x, y, z) |
| m (x, y) | the projection of M in the projection plane, it being assumed that the projection plane P is perpendicular to the axis oz |
| C | the projected point of the centre O in the plane P, defining an original reference system for the point m (x, y) whose coordinates are (x, y) with reference to this original reference system. |

The basis relationship of this projection model is:

$$\overrightarrow{Om} = \frac{f}{\overrightarrow{OM} \cdot \overrightarrow{Oz}} \overrightarrow{OM}$$

which is equivalent in the reference system (O, x, y, z) to:

$$\begin{cases} x = \frac{X \cdot f}{Z} \\ y = \frac{Y \cdot f}{Z} \\ z = f \end{cases}$$

A first-order formulation is defined as follows:

A motion vector (dx, dy) is sought for each pixel as a function of the displacement (dX, dY, dZ) of the scene point M with respect to the centre of projection and as a function of the variation of the focal length df.

The following equations (Eq. 1) are obtained by derivation:

$$\frac{dx}{x} = \frac{df}{f} + \frac{dX}{X} - \frac{dZ}{Z}$$

$$\frac{dy}{y} = \frac{df}{f} + \frac{dY}{Y} - \frac{dZ}{Z}$$

the distance Z is known for each pixel on the basis of the map of the distances.

Having knowledge, on the basis of the animation information elements, namely the information elements pertaining to the kinematic values of the scene, of the geometrical transformation $(R_{dt}, T_{dt})$ for a point $M_o$ of the 3D scene during the interval dt, it is possible to write the following:

$$\overrightarrow{OM_{dt}} =$$

$$R_{dt} \cdot \overrightarrow{OM_o} + \overrightarrow{T_{dt}} \Leftrightarrow \overrightarrow{dOM_o} = \begin{bmatrix} dX \\ dY \\ dZ \end{bmatrix} = \overrightarrow{M_o M_{dt}} = [R_{dt} - I] \cdot \overrightarrow{OM_o} + \overrightarrow{T_{dT}}$$

with:

| | |
|---|---|
| $OM_O$: | vector representing a specific point of the 3D scene, having a position $M_O$ at the instant $t$ |
| $OM_{dt}$: | vector representing the position of the specific point at an instant $t + dt$ |
| $dOM$ or $M_oM_{dt}$: | vector representing the displacement of this point during the time interval $dt$ |
| $R_{dt}$: | matrix of rotation for this point during the interval $dt$ |
| $T_{dt}$: | translation vector for this point during the interval $dt$ |
| $I$: | identity matrix |

$$\overline{OM_o} = \frac{Z}{f}\begin{bmatrix} x \\ y \\ f \end{bmatrix} \quad R_{dt} = \begin{bmatrix} \alpha_x & \beta_x & \gamma_x \\ \alpha_y & \beta_y & \gamma_y \\ \alpha_z & \beta_z & \gamma_z \end{bmatrix} \quad \overline{T_{dt}} = \begin{bmatrix} T_x \\ T_y \\ T_z \end{bmatrix}$$

By developing the above we obtain:

$$\begin{cases} dX = \frac{Z}{f}[(\alpha_x - 1)x + \beta_x y + \gamma_x f] + T_x \\ dY = \frac{Z}{f}[\alpha_y x + (\beta_{y-1})y + \gamma_y f] + T_y \\ dZ = \frac{Z}{f}[\alpha_z x + \beta_z y + (\gamma_z - 1)f] + T_z \end{cases}$$

The introduction of these values in (Eq. 1) gives:

$$\begin{cases} dx = \frac{xdf}{f} + [(\alpha_x - 1)x + \beta_x y + \gamma_x f] + \frac{fT_x}{Z} - \frac{x}{f}[\alpha_z x + \beta_z y + (\gamma_z - 1)f] - \frac{xT_z}{Z} \\ dy = \frac{ydf}{f} + [\alpha_y x + (\beta_y - 1)y + \gamma_y f] + \frac{fT_y}{Z} - \frac{y}{f}[\alpha_z x + \beta_z y + (\gamma_{z-1})f] - \frac{yT_z}{Z} \end{cases}$$

The set (dx,dy) represents the motion vector associated, according to the invention, with each point (x,y) of the 2D image to enable the creation of other images from this image (generated by the rendition algorithm). The coefficients that come into play for the computation of the motion vector on the basis of the x and y co-ordinates of each point are taken from the data defining the evolution (rotation, translation, variation of focal length) of the corresponding point in the scene to be displayed. These coefficients represent the relative apparent evolution of the scene with respect to a viewpoint. It is a relative apparent evolution for not only can the elements of the scene evolve with respect to one another but also the focal distance and the relative position of the camera can evolve with respect to the scene.

It will be seen that the changes normally occur in time for the creation of the successive image sequences but, in a particular case, the changes will be spatial for the creation of two images corresponding to one and the same instant, seen from two different viewpoints. The motion vector (dx, dy) therefore has two possible uses which are very different from each other. These two uses may be combined. In the first use, it will be called a "velocity vector" and in the second use it will be called a "disparity vector".

These formulae show that dx and dy may be split up into nine terms $$\left[1, x, y, x^2, y^2, xy, \frac{1}{Z}, \frac{x}{Z}, \frac{y}{Z}\right],$$

of which they are the linear combination.

Apart from the first term which is constant, these nine terms vary spatially, either in a manner that is totally determined in the image (for the first six terms) or as a function of the observed scene $$\left(\frac{1}{Z} \text{ terms}\right).$$

The following are the coefficients:

| N° | | dx | dy |
|---|---|---|---|
| 1 | 1 | $\gamma_x f$ | $\gamma_y f$ |
| 2 | x | $\frac{df}{f} + (\alpha_x - 1) - \gamma_z - 1$ | $\alpha_y$ |
| 3 | y | $\beta_x$ | $\frac{df}{f} + (\beta_{y-1}) - (\gamma_s - 1)$ |
| 4 | $x^2$ | $-\frac{\alpha_z}{f}$ | 0 |

-continued

| N° | | dx | dy |
|---|---|---|---|
| 5 | $y^2$ | 0 | $-\frac{\beta_z}{f}$ |
| 6 | xy | $-\frac{\beta_z}{f}$ | $-\frac{\alpha_z}{f}$ |
| 7 | $\frac{1}{Z}$ | $fT_x$ | $fT_y$ |

-continued

| N° | dx | dy |
|---|---|---|
| 8 | $\frac{x}{Z}$ $-T_z$ | 0 |
| 9 | $\frac{y}{Z}$ 0 | $-T_z$ |

The set of the first six terms (1 to 6) represents the contribution to the apparent motion of an effect of rotation/zoom of the camera with respect to the scene. Indeed, assuming that the point M is fixed, a rotation of the projection reference system Ox, Oy, Oz simulating a rotation of the camera modifies the x, y co-ordinates of the projected point m(x,y). Similarly, a modification of the focal distance f between the centre of projection O and the projection plane P, simulating a variation of focal distance of the camera, modifies the x, y co-ordinates of the projected point m of a fixed image point M(X,Y,Z).

The components of the motion vector dx, dy may be computed for each point from the above formulae.

They may also be computed by general image processing methods: it is possible to create images comprising x, y co-ordinate points and assign each point a "luminance" value and a "colour" value. For example, the luminance value represents the contribution of the rotation/zoom (terms 1 to 6 of the table) while the colour represents the contribution of the terms 7 to 9. By comprehensive image processing methods, it is possible to make a comprehensive computation, for all the x, y points, of the values of the motion vectors.

Thus, to assess the contribution of the rotation/zoom effect, it is possible to perform a linear combination with weighting operations corresponding to the above table between six images, the luminance of which is a refined function of 1, x, y, $x^2$, $y^2$ and xy.

Figure 4:
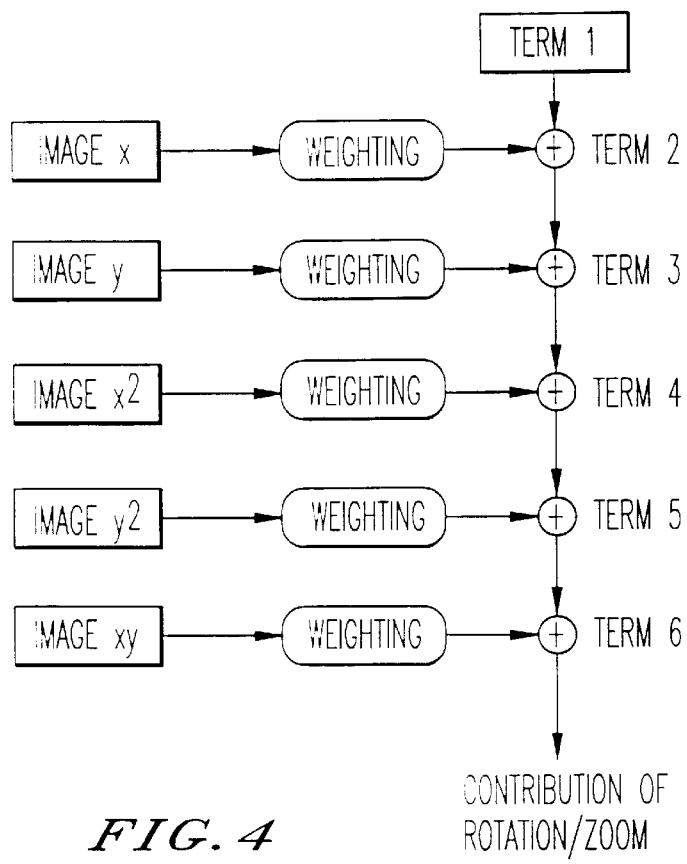
FIG. 4 shows the superimposition of "images" enabling a field of velocity vectors to be obtained.

This procedure is shown in FIG. 4.

The last three terms (7 to 9) of the above table are not zero in the case of a 3D translation between the scene and the camera. In this case, the distance information relating to each point of the 3D scene to be shown must be exploited as explained here below.

In the case of a static scene, observed by a moving camera, the values of $T_x$, $T_y$ and $T_z$ are constant for all the points of the scene and represent the translation shift of the projection reference, it being assumed that the projection plane P is linked to the projection reference.

To obtain the contribution of this translation motion to the field of apparent motion, it is necessary to carry out a linear combination of three image signals whose luminance is set up respectively on the basis of the information 1/z, x/z and y/z for each pixel.

The image 1/z may be obtained on the basis of the information contained in a memory of the distances, hereinafter called Z-buffer, by the application of an appropriate conversion memory.

$$\frac{x}{Z} \text{ and } \frac{y}{Z}$$

are obtained respectively by multiplying this image $$\frac{1}{Z},$$

pixel-by-pixel, with the images x and y.

Should the scene be dynamic, the value of $T_x$, $T_y$ and $T_z$ are no longer constant for the points of the scene and an image synthesis on the basis of the 3D model of the scene is necessary. It is necessary to carry out a step for the assigning of a 3D translation field to the points of the scene, followed by a step for the projection of these 3D translation motions in the image plane. For this purpose, a "colour" is assigned to each peak of a scene, this colour representing the individual translation motion of this peak in space. The propagation of this peak information to the entire scene is approximated by a linear interpolation of the colour on the surface of the objects, for example by using a "Gouraud" type algorithm.

In order to obtain the terms $$\frac{Tx}{Z}, \frac{Ty}{Z} \text{ and } \frac{Tz}{Z},$$

the "colour" information here above, assigned in the 3D space, is first of all projected in the image plane by means of an image synthesis projective algorithm similar to the rendition algorithm. Then the signal is multiplied by the signals $$\frac{1}{Z}, \frac{x}{Z} \text{ and } \frac{y}{Z}$$

and weighted by the appropriate coefficients in order to obtain the terms 7 to 9.

By these combinations of images bearing the values of the constituent terms of the modulus of the apparent velocity vectors, the velocity vectors of the key image are deduced. This is done if the time interval dt is the one that is between two key images. If not, it is always possible to perform calculations corresponding to this interval by assuming that the motion between two key images is linear and at constant speed. The vectors are assigned to the pixels of the key image K(t) in considering the 3D scene at this instant t and at the instant t+dt for the vectors V⁻ and t-dt for the vectors V⁺. For the vectors V⁺, it is the geometrical transformation making it possible to go from the instant t-dt to the instant t that is used for each of the points of the scene corresponding to the pixels of the key image K(t).

Let us now return to the algorithm of FIG. 1. The temporal interpolation step 4 which follows the step 3 just described is described in detail hereinafter. It enables the creation of the missing intermediate images between two key images. At the step 5, these intermediate images are then inserted between the key images generated at the step 2 to obtain the monocular sequence of images.

Figure 5:
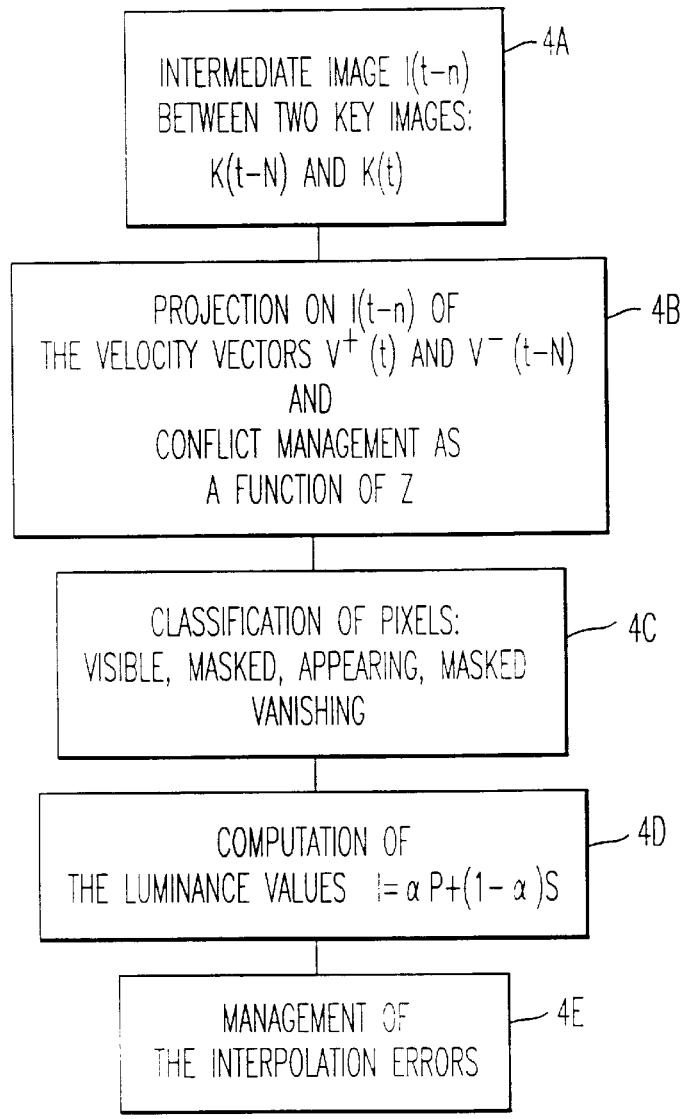
FIG. 5 represents the algorithm for the computation of the temporal interpolation.

FIG. 5 gives a detailed view of the step 4 of FIG. 1, relating to the temporal interpolation, at the steps 4a to 4e. A step 4a defines the intermediate image that will be reconstituted. This image is called I(t-n) located between two key images called K(t) and K(t-N).

Figure 6:
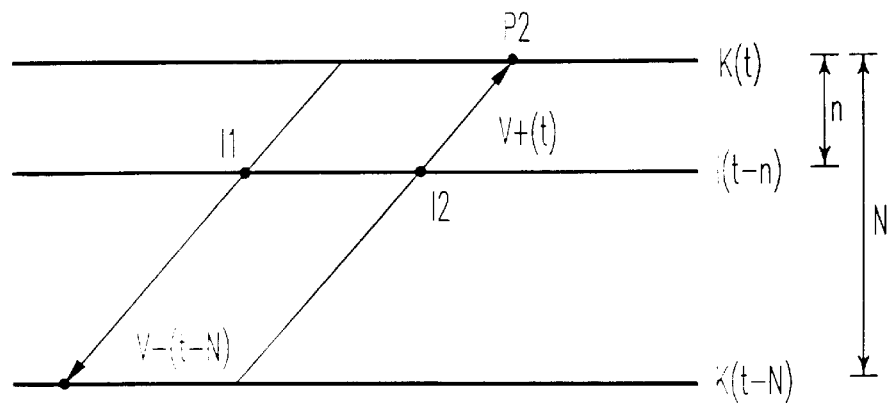
FIG. 6 shows a projection of velocity vectors on the intermediate image.

The step 4b carries out a projection of the velocity vectors V⁺(t) of the key image K(t) in their opposite direction on the intermediate image defined and on the key image K(t-N) and a projection of the velocity vectors V⁻(t-N) of the key image K(t-N) in their opposite direction on the intermediate image and on the key image K(t). The projections are shown in FIG. 6 for an image point P1 of the image K(t-N) and an image point P2 of the key image K(t).

The pixels of the intermediate image corresponding to the projected vectors V⁻ and V⁺, namely I1 and I2, are the pixels closest to the projection points, the image being defined on a grid of pixels.

Thus, if N INT (NEAREST INTEGER) designates the nearest integer value and therefore corresponds to a point of the spatial sampling grid, we have:

$$I1 = N\ INT\ p_1 - \frac{N-n}{N} \times V^-$$

$$I1 = N\ INT\ p_2 - \frac{n}{N} \times V^+$$

$I_1$, $I_2$, $P_1$ and $P_2$ are the co-ordinates of the points on the grid, V⁻ and V⁺ are the modules of the velocity vectors.

This step 4b also consists, during this projection, of the management of the conflicts.

Figure 7:
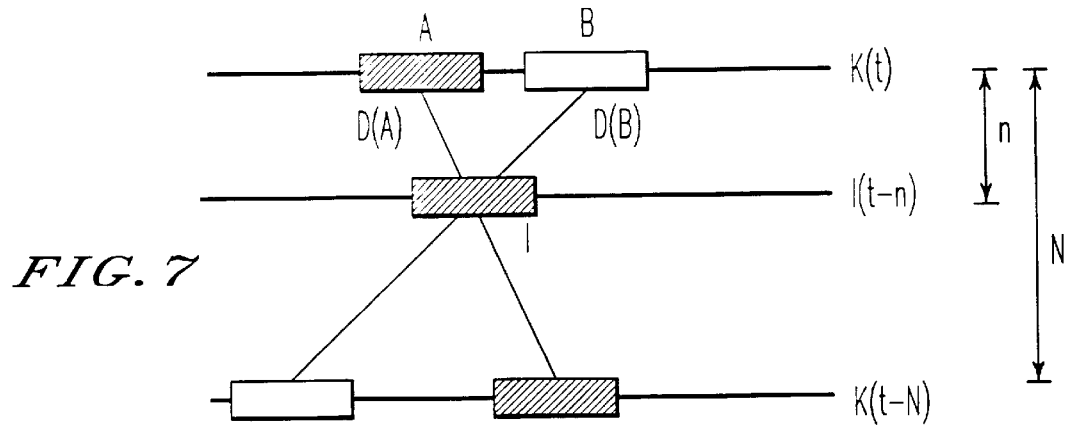
FIG. 7 shows a conflict of projection on the intermediate image.

The two fields of vectors V⁺ (t) and V⁻ (t-N) are scanned methodically. There is a conflict when two significantly different velocity vectors are projected to one and the same point I of I(t-n). This occurs especially when there is a fine object in the foreground that is displacement (relatively) with respect to the background. It is then necessary to choose the vector corresponding to the object closest to the camera, in this case the object in the foreground. The information on distance from the camera being known at each pixel of the key images, it is consequently also associated with each projected velocity vector. The vector bearing the smallest distance information (Z) is thus chosen and this distance information is stored at the point I so as to settle future conflicts if any at this same interpolated point. In the example of FIG. 7, the object A is closer to the camera than B (Z(A)<Z(B)). It is therefore the value D(A) that is actually projected at I.

When the two fields of vectors have been entirely scanned, it is possible that there will remain pixels of I(t-n) without any projected velocity vector. They are assigned a velocity vector by interpolation of the vectors projected in the neighbourhood.

The step 4c then consists of a classification of the interpolated pixels.

Figure 8A:
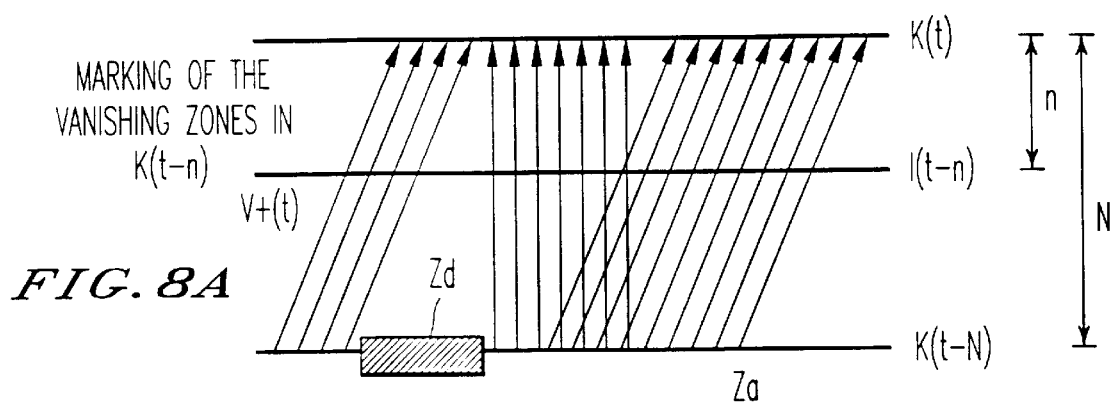
FIG. 8 shows a classification of "appearing" and "vanishing" zones.
Figure 8B:
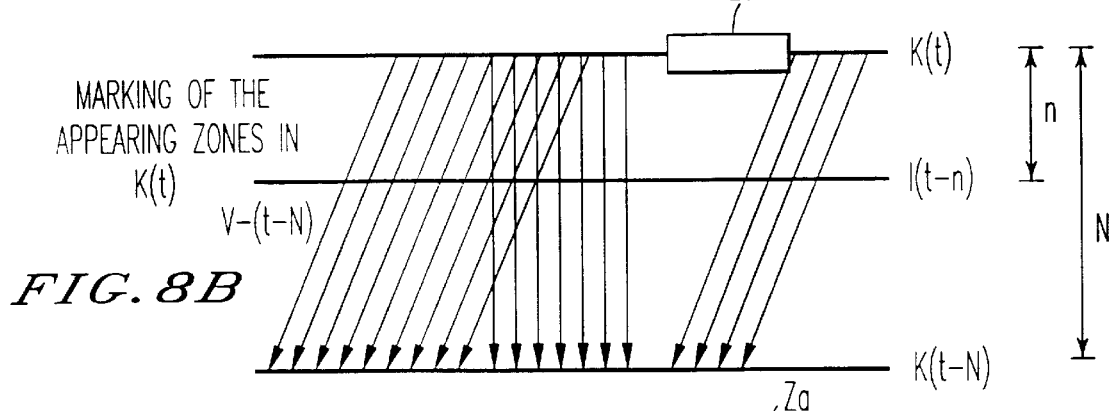
Figure 8C:
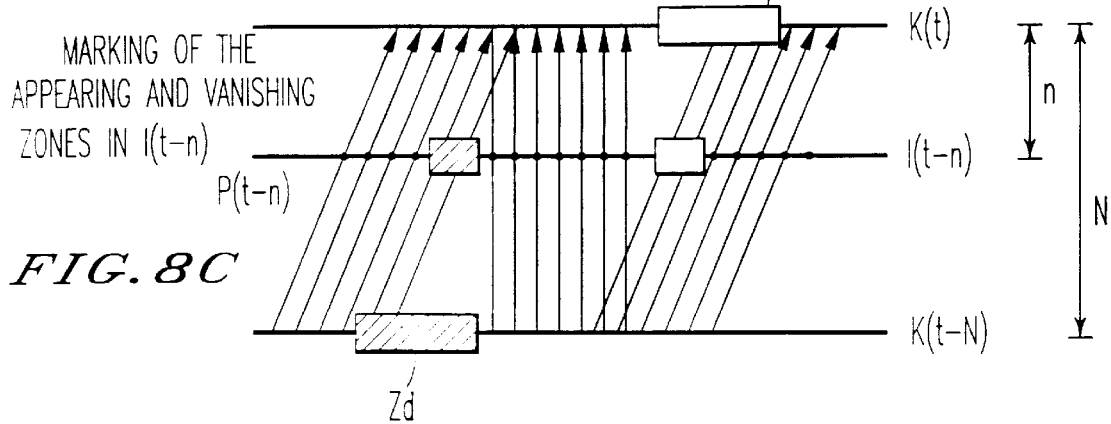

The pixels of the intermediate image I(t-n) are divided into three classes, depending on whether they are visible in the two key images K(t-N) and K(t) (i.e. "standard" pixels), visible in K(t-N) and masked in K(t) ("vanishing" pixels) or else, on the contrary, masked in K(t-N) and visible in K(t) ("appearing" pixels). The labelling of the pixels I(t-n) is done in two stages:

Labelling of the key images by the reverse projection, along their path, of V⁺(t) and V⁻(t-N) on K(t-N) and K(t) respectively: as shown in FIG. 8, the pixels without projected vectors ("holes") correspond to the zones (Zd, FIG. 8a) which will be masked for K(t-N) (vanishing pixels) and to the zones (Za, FIG. 8b) which will be unmasked for K(t) (appearing pixels) (we have taken the example of a fixed object in the foreground and a moving background).

Labelling of the intermediate image by the examination of the label of the zones K(t) and K(t-N) at which the vectors actually projected on I(t-n) are aimed. This amounts to projecting the "appearing" and "vanishing" labels on the intermediate image.

The next 4d step computes the luminance values of the pixels I of the intermediate image by the interpolation of the luminance values of the pixels P and S of the images K(t-N) and K(t) corresponding to the projection vector chosen for I.

In terms of luminance:

$$I = \alpha \times P + (I-\alpha) \times S$$

where α takes the following values:

α=n/N if I is labelled "normal".

n and N being defined by the fact that the $n^{th}$ intermediate image before K(t) is considered and that the key images K(t) and K(t-N) are separated by (N-1) intermediate images.

α=0 if I is labelled as "appearing".

α=1 if I is labelled as "vanishing".

Finally, the last step 4e enables the management of the interpolation errors.

In low-cost fast synthesis applications, it is not possible to predict interpolation errors if any unless the rendition algorithm is used to verify it. These errors are foreseeable firstly in the zones where it has been necessary to fill a hole in the field of velocity vectors. This results in a failure of the simple model, based on displacement and structure, that is used. These zones of uncertainty can be extended to all the pixels of the intermediate images for which V⁺(t) and V⁻(t-N) are not consistent. An estimated mask of the errors is deduced therefrom and the rendition algorithm is applied to synthesise the corresponding pixels.

The foregoing method and computations may also be exploited to generate images for a binocular or stereoscopic sequence.

Figure 9:
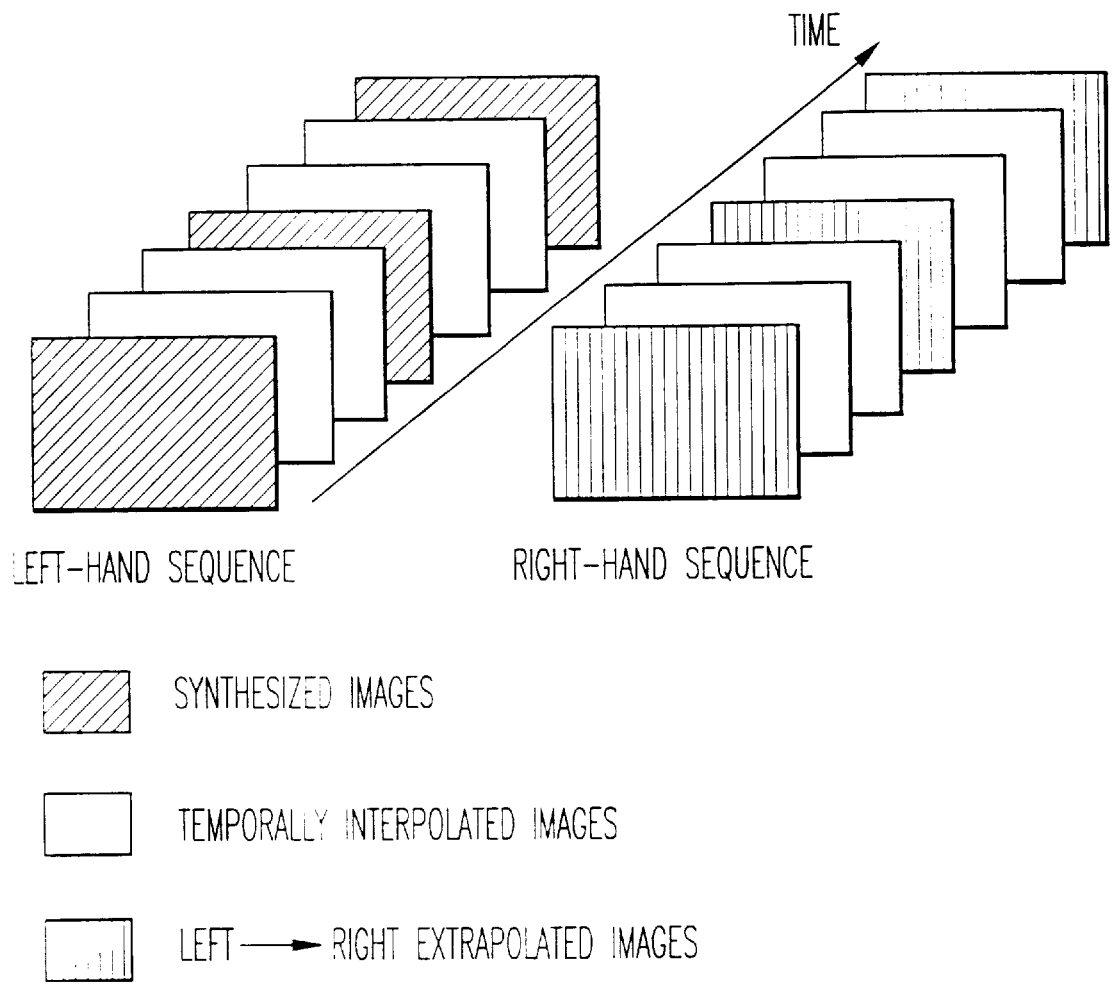
FIG. 9 shows a stereoscopic sequence.

FIG. 9 shows the key and intermediate images generated for a left-hand sequence and for a right-hand sequence, these two stereoscopic channels enabling the display to be viewed in relief.

The generation, for example, of the left-hand sequence is identical to the generation of the monocular sequence as described here above. In the figure, two intermediate images are interpolated between two consecutive key images shown in black, and the gain in computation time is then in a ratio of three with respect to the left-hand image. The key images of the right-hand sequence are vertically hatched. These images are extrapolated from the key images of the left-hand sequence as explained further below and the intermediate images are computed on the basis of these new key images. If the time corresponding to the extrapolation is negligible as compared with the time for the implementation of the rendition algorithm enabling the generation of the key images of the left-hand channel, the gain in computation time then corresponds to a ratio of six in the example presented.

Figure 10:
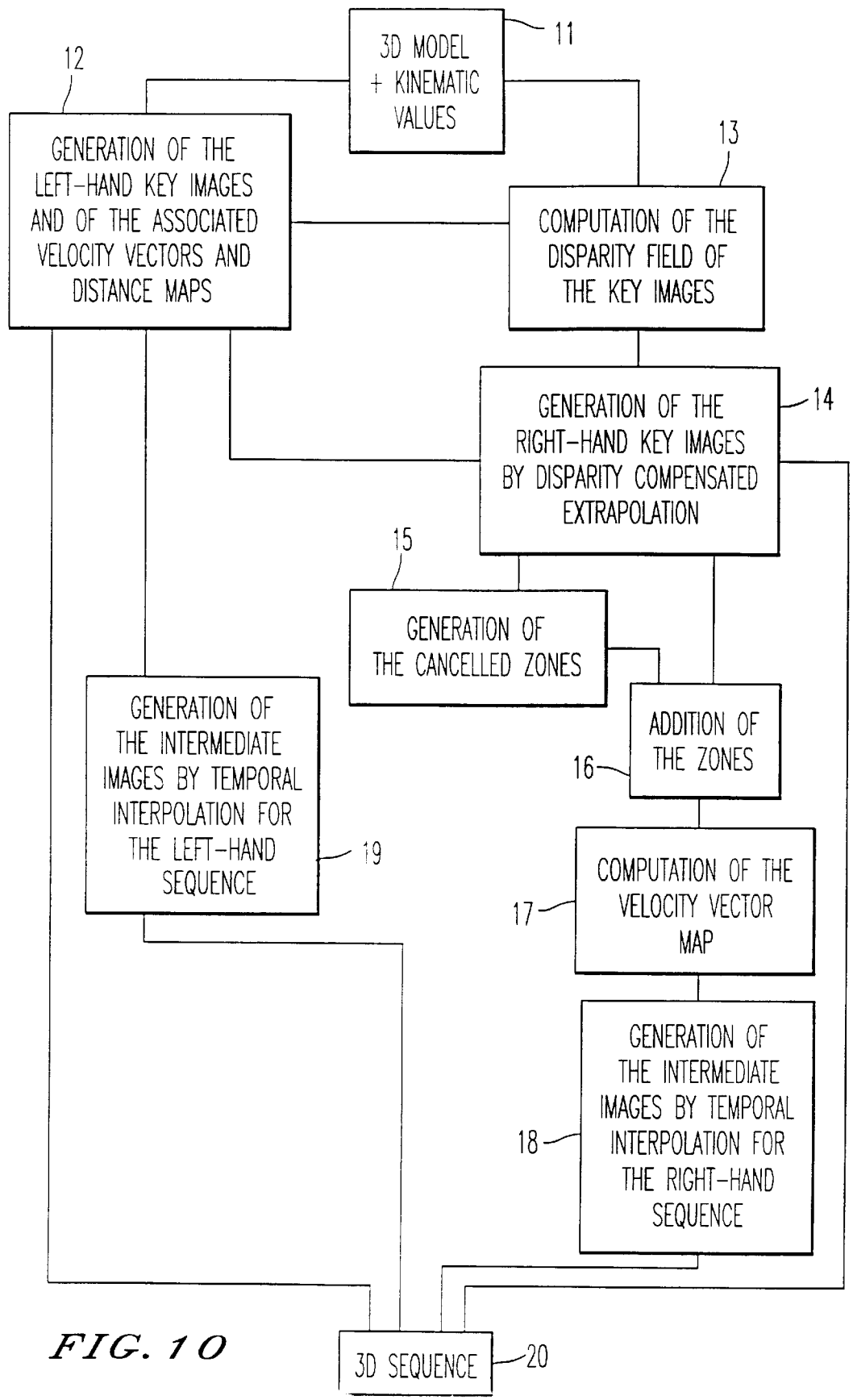
FIG. 10 represents an algorithm for the generation of the stereoscopic sequence.

This method of accelerating the generation of binocular sequences of synthetic images by extrapolation is described by means of the diagram of FIG. 10.

Using data of the 3D scene model and its kinematic values available at the input 11, a computation is made of the key images, the fields of apparent velocity vectors and of distance corresponding to these images for the monocular sequence, for example the left-hand sequence, in the same way as in the steps 2 and 3 of FIG. 1 for a generation of monocular sequences, in this case the step 12. It therefore makes use, inter alia, of the rendition algorithms for the generation of the key images.

A step 13 processes the data computed at the step 12 and those of the 3D model available at the input 11 to perform a computation of vectors called disparity vectors.

A real point of the 3D scene is projected at points having different co-ordinates in the right-hand image and the left-hand image. Indeed, the centre of projection O' used for the right-hand image is offset with respect to the centre of projection O used for the left-hand image. This offset corresponds to an apparent offset of the static 3D scene with respect to the centre of projection O. This is what creates the stereoscopic effect and, for each pixel having co-ordinates $i_g, j_g$ of the left-hand image, there corresponds a pixel having co-ordinates $i_d, j_d$ of the right-hand image. The disparity vector is the vector of translation of a pixel with co-ordinates $i_d, j_d$ towards the pixel with co-ordinates $i_g, j_g$. It is a motion vector assigned to each pixel of the original image representing the evolution of the image during the displacement of the projection point.

In another way, it can be said that the binocular disparity vector $D(i_g, j_g)$ assigned to the key image of the left-hand sequence brings the projections of the same real point of the 3D scene into correspondence in the two 2D views. It is this disparity vector that enables the right-hand key image to be extrapolated from the left-hand key image.

The computation of these disparity vectors is deduced very simply from the computations of the apparent velocity vectors as described here above.

Indeed, the disparity vector corresponds to two views of the same 3D scene but at different angles to achieve the stereoscopic effect.

These two views correspond to an apparent displacement of the 3D scene which is fixed and therefore static. This displacement corresponds to the two viewpoints.

Thus, it is enough to compute the apparent velocity vectors for a static scene that has undergone this displacement, according to the method explained here above during the computation of the velocity vectors of the key image of a monocular sequence. These velocity vectors are the fictitious velocity vectors enabling the computation of the right-hand image on the basis of the left-hand image. These images correspond to one and the same instant t and not to different instants as in the case of real velocity vectors. It is thus possible to compute the disparity vectors of all the image points at an instant t.

All the disparity vectors for a key image form the disparity field. On the basis of this field and of the corresponding key image, a disparity-compensated extrapolation is carried out in the step 14.

The extrapolation of the right-hand image Id(t) from the left-hand image Ig(t) and the disparity field D(t) of this image is explained with reference to FIG. 11.

Each pixel of Ig(t) is projected in the reverse direction of the disparity vector on the image Id(t). Should there be conflict, i.e. if several pixels of Ig(t) should be projected on one and the same point, the choice of the pixel closest to the camera is done as seen here in relation to the generation of a monocular image. The distance map associated with the key images enables this selection.

Figure 11:
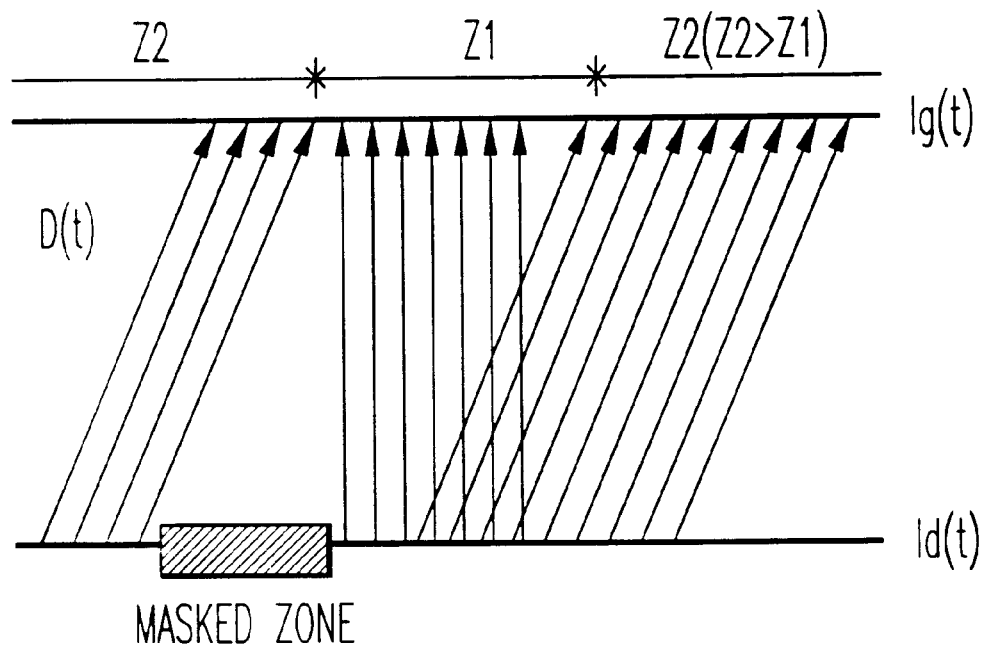
FIG. 11 shows a masked zone of a key image of the right-hand channel.

The pixels of the image Id(t) at which no projection arrives, as shown in FIG. 11, normally correspond to the zones seen in Id(t) and masked in Ig(t). They are computed at the step 15 by the rendition algorithm that has enabled the generation of Ig(t). These reconstituted pixels are added, in the step 16, to the image obtained in the step 14.

Figure 12:
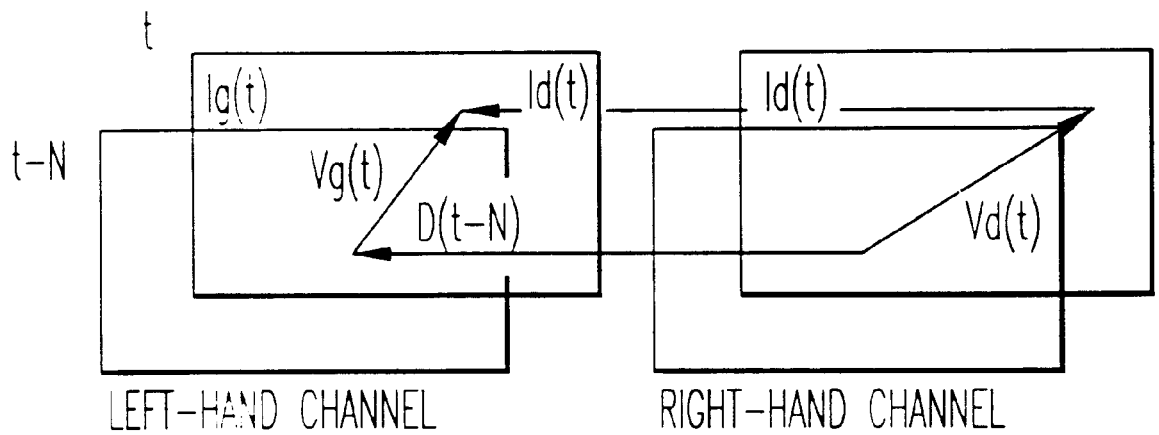
FIG. 12 shows the determining of the disparity vector.

To the key images of the right-hand sequence thus available in the step 16, there are added the velocity vector maps computed in the step 17. The field of velocity vectors Vd(t) between two consecutive right-hand key images Id(t-N) and Id(t) is deduced from the field of velocity vectors Vg(t) between two consecutive left-hand key images Ig(t-N) and Ig(t) and from the binocular disparity fields D(t-N) and D(t) of these key images by the relationship symbolised by FIG. 12:

$$Vg(t) - Vd(t) + D(t-N) - D(t) = 0$$

In practice, assuming that the disparity of a pixel varies slightly from one key image to the other, the apparent speeds of two points made to correspond in the right-hand and left-hand views by the disparity vector are almost equal. Thus, the map of the velocity vector and distance vector of the right-hand key image may be deduced from that of the vectors of the left-hand image and from its disparity field.

The step 18 then performs the temporal interpolation according to the already explained method. This interpolation is also performed in the step 19 on the left-hand channel so that, by the juxtaposition at the step 20 of these image sequences thus generated with the key images, the sequence is obtained stereoscopically.

The computation method used to determine the displacement values have been given herein by way of an indication.

Thus the velocity vectors could equally well be computed on the basis of the data for the modelling of the scene at two instants t and t+dt.

We claim:
1. Method for the generation of synthetic images from structural data modeling a 3D scene to be displayed and data representing an apparent relative evolution of the scene with respect to a viewpoint, the structural data enabling the computation of the co-ordinates of points of the 3D scene and the data defining the evolution of the scene enabling the computation of the coefficients of geometrical transformation associated with these points, at which there is generated, on the basis of the structural data and a rendition algorithm, a 2D image representing the scene seen from this viewpoint, characterized in that, with each point of the 2D image, there is associated a corresponding point of the 3D image and a motion vector representing the displacement of this point of the image due to the apparent displacement of the corresponding point of the 3D scene with respect to the viewpoint, said motion vectors of the pixels of the image generated having been computed on the basis of the co-ordinates and coefficients of the associated points of the 3D scene in order to use them in the generation of at least one other 2D image on the basis of the first image, and then the generated images are shown on a display screen wherein the data defining the evolution comprise data on the evolution of the viewpoint of observation of the 3D scene corresponding to an apparent displacement of the static scene defined at an instant t, and in that a second image is computed by spatial extrapolation on the basis of a reference image that is generated from the rendition algorithm and corresponds to a viewpoint of the scene at the instant t, and on the basis of the motion vectors called disparity vectors and calculated from the said data, this second image corresponding to a second viewpoint of the scene at the same instant t to form a stereoscopic view.

2. Method according to claim 1, characterised in that a binocular sequence is formed by a reference channel constituted by key images generated on the basis of the rendition algorithm and intermediate images formed by temporal interpolation, and a conjugated channel constituted by key images formed by extrapolation of the key images of the reference channel of the basis of their disparity vectors and intermediate images formed by the temporal interpolation of these key images for the achievement of the stereoscopic effect.

3. Method according to claim 2, characterised in that the velocity vectors of a key image of the conjugated channel are computed on the basis of the velocity vectors and disparity vectors of the corresponding key image of the reference channel.

4. Method according to claim 3, characterized in that the zones in the conjugated image not placed in correspondence by the disparity vectors are generated by the rendition algorithm.

5. Method according to claim 2, characterized in that the zones in the conjugated image not placed in correspondence by the disparity vectors are generated by the rendition algorithm.

6. Method according to claim 1, characterised in that the zones in the conjugated image not placed in correspondence by the disparity vectors are generated by the rendition algorithm.

7. Method for the generation of synthetic images from structural data modeling a 3D scene to be displayed and data representing an apparent relative evolution of the scene with respect to a viewpoint, the structural data enabling the computation of the co-ordinates of points of the 3D scene and the data defining the evolution of the scene enabling the computation of the coefficients of geometrical transformation associated with these points, at which there is generated, on the basis of the structural data and a rendition algorithm, a 2D image representing the scene seen from this viewpoint, characterized in that, with each point of the 2D image, there is associated a corresponding point of the 3D image and a motion vector representing the displacement of this point of the image due to the apparent displacement of the corresponding point of the 3D scene with respect to the viewpoint, said motion vectors of the pixels of the image generated having been computed on the basis of the co-ordinates and coefficients of the associated points of the 3D scene in order to use them in the generation of at least one other 2D image on the basis of the first image, and then the generated images are shown on a display screen wherein the data defining the evolution comprise data on the temporal evolution of the 3D scene, and in that an intermediate image is computed by temporal interpolation on the basis of a reference image that is generated by the use of the rendition algorithm and that corresponds to the 3D scene at the instant t, and on the basis of the motion vectors called velocity vector and calculated from the said data, said intermediate image corresponding to a different instant and wherein a sequence of monocular images is constituted by key images generated on the basis of the rendition algorithm of the 3D scene and of intermediate images achieved by temporal interpolation, on the basis of these key images and of the computed velocity vectors.

8. Method according to claim 7, characterised in that it attributes, to each key image K(t), a first field of apparent velocity vectors $V^-$ whose reverse vectors define, for each pixel of the key image K(t), its displacement from this image to the next key image K(t+N), a second field of apparent velocity vectors $V^+$ defining the displacement of these pixels from the previous key image K(t-N) to the key image K(t), these vectors being computed on the basis of the data relating to the structure and evolution of the 3D scene, a distance map associating, with each pixel of the key image K(t), the distance from the corresponding visible point of the 3D scene to the point from which the scene is seen, and in that the interpolation between two key images K(t-N) and K(t) is done by reverse projection of the vectors $V^+$ of the key image K(t) on the intermediate image and the key image K(t-N) and by reverse projection of the vectors $V^-$ of the key image K(t-N) on the intermediate image and the key image K(t).

9. Method according to claim 8 characterised in that, during the temporal interpolation of an intermediate image I(t-n) between two key images K(t-N) and K(t), a conflict of projection between vectors $V^+$ of the image K(t) or between vectors $V^-$ of the image K(t-N) on the intermediate image I(t-n), i.e. the assignment of several vectors to one and the same pixel of the intermediate image, each vector being assigned to the closest pixel of its projection on the intermediate image, is resolved by choosing, as the chosen vector, that one whose origin is the pixel of the key image having the shortest distance, and in that the eliminated vectors are not taken into account for the temporal interpolation of this intermediate image.

10. Method according to claim 9, characterized in that, during the temporal interpolation of an intermediate image I(t-n) between two key images K(t-N) and K(t), a first step defines "appearing" and "vanishing" zones for each key image, the appearing zones on k(t), corresponding to zones or pixels not aimed at by the inverted apparent velocity vectors $V^-$ of the image K(t-N), the vanishing zones on K(t-N) corresponding to zones or pixels not aimed at by the inverted apparent velocity vectors $V^+$ reverse of the image K(t), the vectors $V^+$ that reach the appearing zones and the vectors $V^-$ that reach the vanishing zones being labelled as a function of these zones, a second step defines appearing and vanishing zones of intermediate image as corresponding respectively to the projections, on this intermediate image, of the vectors $V^+$ and $V^-$ labelled as being appearing and vanishing, a third step uses these zones in the temporal interpolation of this intermediate image.

11. Method according to claim 10, characterized in that the appearing and vanishing zones of the intermediate image I(t-n) are generated respectively and exclusively on the basis of the corresponding appearing zones of the key image K(t) and of the corresponding vanishing zones of the key image K(t-n), the other so-called "normal" zones being interpolated by taking account of the zones corresponding both to K(t-N) and K(t).

12. Method according to claim 9, characterized in that the management of interpolation errors is done by means of an estimated mask of the interpolation errors corresponding to the zones of the intermediate images for which the vectors $V^+$ and $V^-$ are not consistent.

13. Method according to claim 8 characterised in that, during the temporal interpolation of an intermediate image I(t-n) between two key images K(t-N) and K(t), a first step defines "appearing" and "vanishing" zones for each key image, the appearing zones on k(t) corresponding to zones or pixels not aimed at by the inverted apparent velocity vectors $V^-$ of the image K(t-N), the vanishing zones on K(t-N) corresponding to zones or pixels not aimed at by the inverted apparent velocity vectors $V^+$ reverse of the image K(t), the vectors $V^+$ that reach the appearing zones and the vectors $V^-$ that reach the vanishing zones being labelled as a function of these zones, a second step defines appearing and vanishing zones of intermediate image as corresponding respectively to the projections, on this intermediate image, of the vectors $V^+$ and $V^-$ labelled as being appearing and vanishing, a third step uses these zones in the temporal interpolation of this intermediate image.

14. Method according to claim 13, characterised in that the appearing and vanishing zones of the intermediate image I(t-n) are generated respectively and exclusively on the basis of the corresponding appearing zones of the key image K(t) and of the corresponding vanishing zones of the key image K(t-n), the other so-called "normal" zones being interpolated by taking account of the zones corresponding both to K(t-N) and K(t).

15. Method according to claim 13, characterized in that the management of interpolation errors is done by means of an estimated mask of the interpolation errors corresponding to the zones of the intermediate images for which the vectors $V^+$ and $V^-$ are not consistent.

16. Method according to claim 8, characterised in that the management of interpolation errors is done by means of an estimated mask of the interpolation errors corresponding to the zones of the intermediate images for which the vectors $V^+$ and $V^-$ are not consistent.

* * * * *